United States Patent Office.

SAMUEL WEAVER, OF POTTSTOWN, PENNSYLVANIA.

Letters Patent No. 113,228, dated March 28, 1871.

IMPROVEMENT IN COMPOSITIONS FOR TREATING IRON.

The Schedule referred to in these Letters Patent and making part of the same.

*To all whom it may concern:*

Be it known that I, SAMUEL WEAVER, of Pottstown, in the county of Montgomery and in the State of Pennsylvania, have invented a certain new and useful Composition for Annealing Steel; and do hereby declare that the following is a full, clear, and exact description thereof.

My invention belongs to a class of compositions used for removing the temper from steel, so as thereby to render the same soft and easily cut or worked; and It consists in combining bituminous coal, lime, and wood-ashes in the manner substantially as is hereinafter set forth.

In the preparation of my composition I take two parts of bituminous coal, one part of air-slacked lime, and one part of dry wood-ashes, and, after having finely pulverized each ingredient, mix them thoroughly together.

The composition thus prepared being placed in any suitable receptacle, the steel to be operated upon is heated thoroughly, and placed within and entirely covered by said composition, which not only prevents said steel from becoming rapidly cool, but also, by chemical action thereon, renders it more thoroughly and uniformly soft than would otherwise be possible.

Having thus fully set forth the nature and merits of my invention,

What I claim as new is—

The hereinbefore-described composition, substantially as and for the purpose specified.

In testimony that I claim the foregoing I have hereunto set my hand this      day of March, 1871.

SAMUEL WEAVER.

Witnesses:
   JNO. S. WEILER,
   WM. SURNEHART.